(12) United States Patent
Hakura et al.

(10) Patent No.: US 8,810,592 B2
(45) Date of Patent: Aug. 19, 2014

(54) VERTEX ATTRIBUTE BUFFER FOR INLINE IMMEDIATE ATTRIBUTES AND CONSTANTS

(75) Inventors: Ziyad S. Hakura, Gilroy, CA (US); James C. Bowman, Pescadero, CA (US); Jimmy Earl Chambers, Madison, AL (US); Philip Browning Johnson, Campbell, CA (US); Philip Payman Shirvani, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 168 days.

(21) Appl. No.: 12/895,546

(22) Filed: Sep. 30, 2010
(Under 37 CFR 1.47)

(65) Prior Publication Data

US 2011/0102448 A1    May 5, 2011

Related U.S. Application Data

(60) Provisional application No. 61/250,362, filed on Oct. 9, 2009.

(51) Int. Cl.
*G06T 15/00* (2011.01)
*G06T 1/60* (2006.01)
*G06T 1/00* (2006.01)

(52) U.S. Cl.
CPC ................................... *G06T 15/005* (2013.01)
USPC .......................... 345/581; 345/419; 345/564

(58) Field of Classification Search
USPC ......................................................... 345/505
See application file for complete search history.

(56) References Cited

U.S. PATENT DOCUMENTS

| | | | | |
|---|---|---|---|---|
| 5,214,753 | A * | 5/1993 | Lee et al. | 345/610 |
| 5,696,944 | A * | 12/1997 | Krech, Jr. | 345/539 |
| 5,870,627 | A * | 2/1999 | O'Toole et al. | 710/22 |
| 6,515,671 | B1 * | 2/2003 | Lindholm et al. | 345/506 |
| 7,002,586 | B2 * | 2/2006 | Chiu et al. | 345/505 |
| 7,400,326 | B1 * | 7/2008 | Acocella et al. | 345/520 |
| 7,701,459 | B1 * | 4/2010 | Mrazek et al. | 345/505 |
| 7,999,817 | B1 * | 8/2011 | Tao et al. | 345/530 |
| 8,237,725 | B1 * | 8/2012 | Bowman et al. | 345/557 |
| 2002/0126126 | A1 * | 9/2002 | Baldwin | 345/557 |
| 2003/0016217 | A1 * | 1/2003 | Vlachos et al. | 345/423 |
| 2003/0122838 | A1 * | 7/2003 | Doyle et al. | 345/571 |
| 2003/0184555 | A1 * | 10/2003 | Fraser | 345/582 |
| 2005/0195188 | A1 * | 9/2005 | Goel et al. | 345/423 |
| 2006/0053188 | A1 * | 3/2006 | Mantor et al. | 708/490 |
| 2006/0053189 | A1 * | 3/2006 | Mantor | 708/490 |
| 2006/0176310 | A1 * | 8/2006 | Arnaud et al. | 345/582 |

(Continued)

*Primary Examiner* — David Zarka
*Assistant Examiner* — Jason Pringle-Parker
(74) *Attorney, Agent, or Firm* — Patterson & Sheridan, LLP

(57) ABSTRACT

One embodiment of the present invention sets forth a technique for providing primitives and vertex attributes to the graphics pipeline. A primitive distribution unit constructs the batches of primitives and writes inline attributes and constants to a vertex attribute buffer (VAB) rather than passing the inline attributes directly to the graphics pipeline. A batch includes indices to attributes, where the attributes for each vertex are stored in a different VAB. The same VAB may be referenced by all of the vertices in a batch or different VABs may be referenced by different vertices in one or more batches. The batches are routed to the different processing engines in the graphics pipeline and each of the processing engines reads the VABs as needed to process the primitives. The number of parallel processing engines may be changed without changing the width or speed of the interconnect used to write the VABs.

17 Claims, 9 Drawing Sheets

(56) References Cited

U.S. PATENT DOCUMENTS

| | | | |
|---|---|---|---|
| 2007/0018990 A1* | 1/2007 | Shreiner | 345/505 |
| 2007/0030280 A1* | 2/2007 | Paltashev et al. | 345/506 |
| 2007/0146378 A1* | 6/2007 | Sorgard et al. | 345/581 |
| 2007/0165043 A1* | 7/2007 | Fouladi et al. | 345/558 |
| 2008/0001956 A1* | 1/2008 | Markovic et al. | 345/522 |
| 2008/0030513 A1* | 2/2008 | Jiao et al. | 345/530 |
| 2008/0246773 A1* | 10/2008 | Jiao et al. | 345/522 |
| 2009/0027383 A1* | 1/2009 | Bakalash et al. | 345/419 |
| 2009/0073168 A1* | 3/2009 | Jiao et al. | 345/426 |
| 2009/0073177 A1* | 3/2009 | Jiao et al. | 345/501 |
| 2009/0141033 A1* | 6/2009 | Street | 345/506 |
| 2009/0295804 A1* | 12/2009 | Goel et al. | 345/426 |
| 2009/0303245 A1* | 12/2009 | Soupikov et al. | 345/582 |
| 2010/0164983 A1* | 7/2010 | Lawrence et al. | 345/611 |
| 2010/0302246 A1* | 12/2010 | Jiao et al. | 345/426 |

* cited by examiner

VERTEX ATTRIBUTE BUFFER FOR INLINE IMMEDIATE ATTRIBUTES AND CONSTANTS

CROSS-REFERENCE TO RELATED APPLICATIONS

This application claims priority benefit to United States provisional patent application titled, "VERTEX ATTRIBUTE BUFFER FOR INLINE IMMEDIATE ATTRIBUTES AND CONSTANTS," filed on Oct. 9, 2009 and having Ser. No. 61/250,362.

BACKGROUND OF THE INVENTION

1. Field of the Invention

The present invention generally relates to graphics processing and more specifically to distributing and accessing vertex data.

2. Description of the Related Art

In a conventional graphics processing unit (GPU), a data assembler unit constructs batches of primitives and vertex attributes that are output to a graphics pipeline for processing. When multiple processing units are used in a graphics pipeline to perform parallel processing of the primitives, the primitives and vertex attributes are transported for longer distances through bus interconnects to reach the multiple processing units. As the number of vertex attributes increases to produce more complex and realistic images, the width or speed of the bus interconnects also increases. Additional circuitry may be needed to support the wider and/or faster transfers.

Accordingly, what is needed in the art is a technique for providing primitives and vertex attributes to the graphics pipeline while minimizing the amount of hardware and wiring required to do so.

SUMMARY OF THE INVENTION

A system and method of providing primitives and vertex attributes to the graphics pipeline. A primitive distribution unit constructs the batches of primitives and writes inline attributes and constants to a vertex attribute buffer (VAB) rather than passing the inline attributes directly to the graphics pipeline. A batch includes a VAB index associated with each vertex, where a unique index implies a different VAB containing one or more attributes that are different from other VABs. The same VAB may be referenced by all of the vertices in a batch or different VABs may be referenced by different vertices in one or more batches. The batches are routed to the different processing engines in the graphics pipeline and each of the processing engines reads the VABs as needed to process the primitives. The number of parallel processing engines may be increased or decreased without changing the width or speed of the interconnect used to write the VABs.

Various embodiments of a method of the invention for storing and distributing vertex attributes includes storing vertex attributes of a vertex in a first vertex attribute buffer that is specified by a first vertex attribute buffer index and distributing the first vertex attribute buffer index to multiple parallel processing engines. The vertex attributes are read from the first vertex attribute buffer by at least two of the multiple parallel processing engines and the vertex attributes are processed to produce shaded pixels of an image.

Various embodiments of the invention include a system for storing and distributing vertex attributes. The system includes a primitive distribution unit that is configured to store vertex attributes of a vertex in a first vertex attribute buffer that is specified by a first vertex attribute buffer index and distribute the first vertex attribute buffer index to multiple parallel processing engines. The multiple parallel processing engines are configured to read the vertex attributes from the first vertex attribute buffer and process the vertex attributes to produce shaded pixels of an image.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
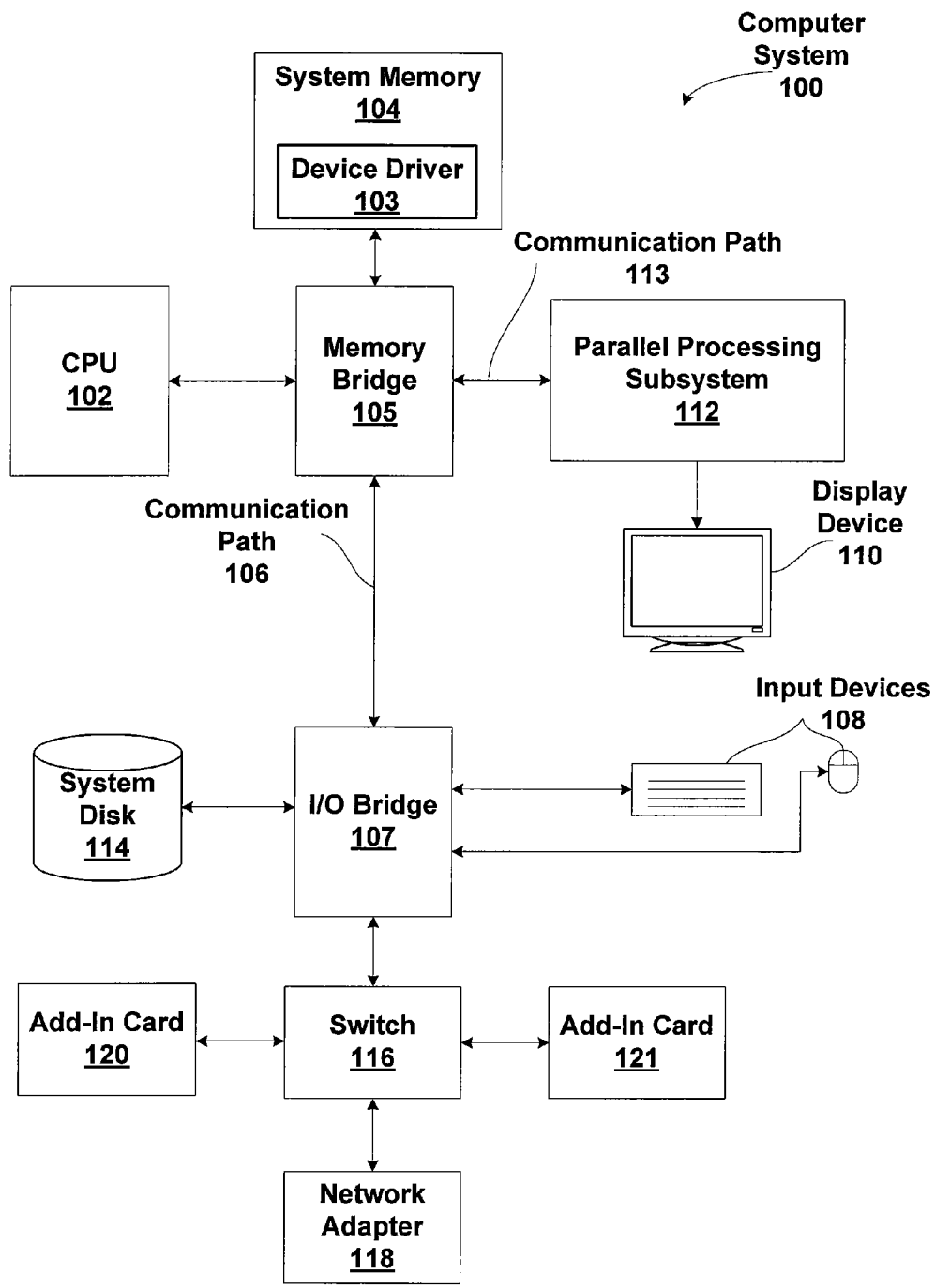
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
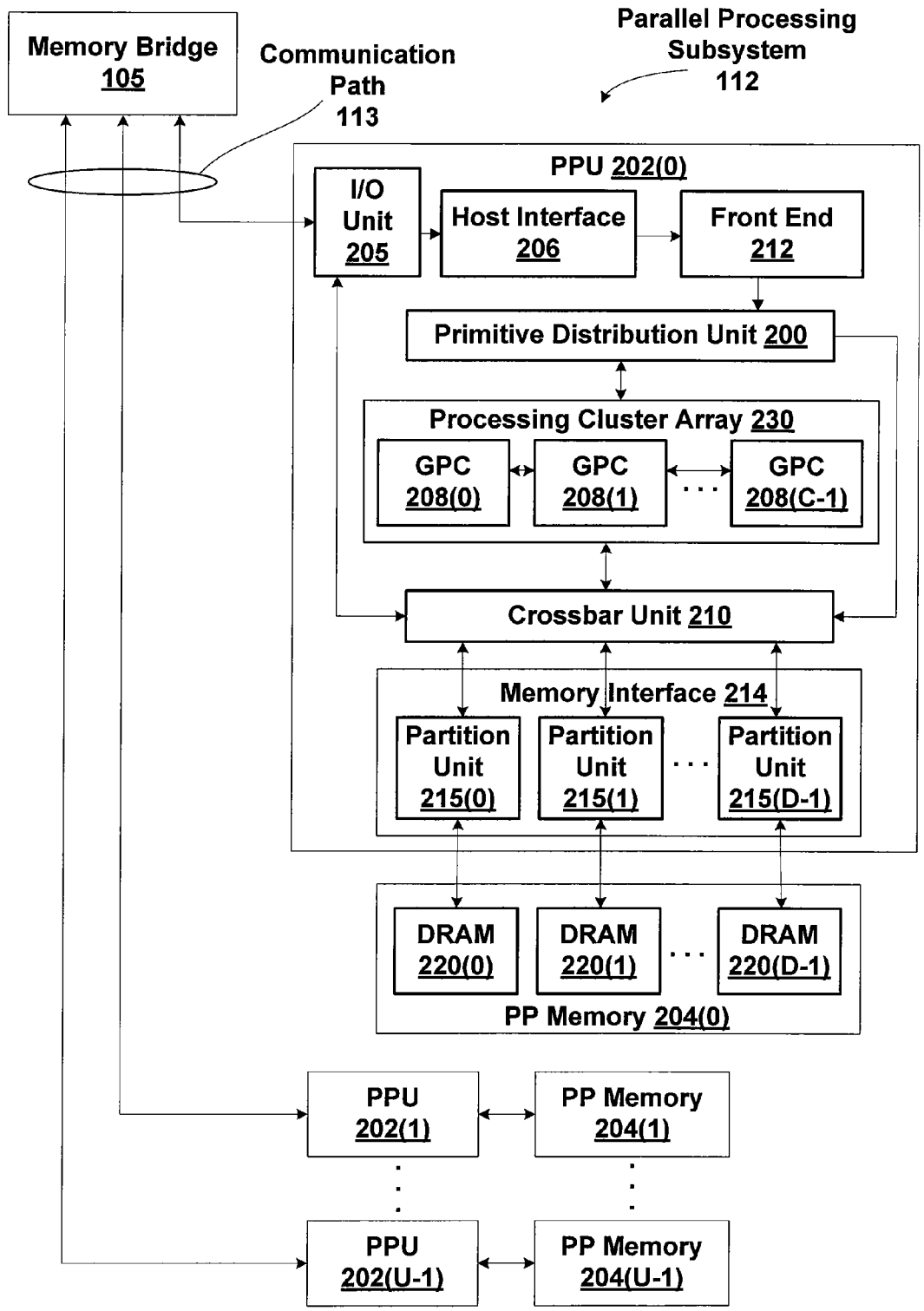
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a primitive distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Primitive distribution unit 200 may be configured to fetch the indices corresponding to the tasks, or primitive distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A primitive distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where $D \geq 1$. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
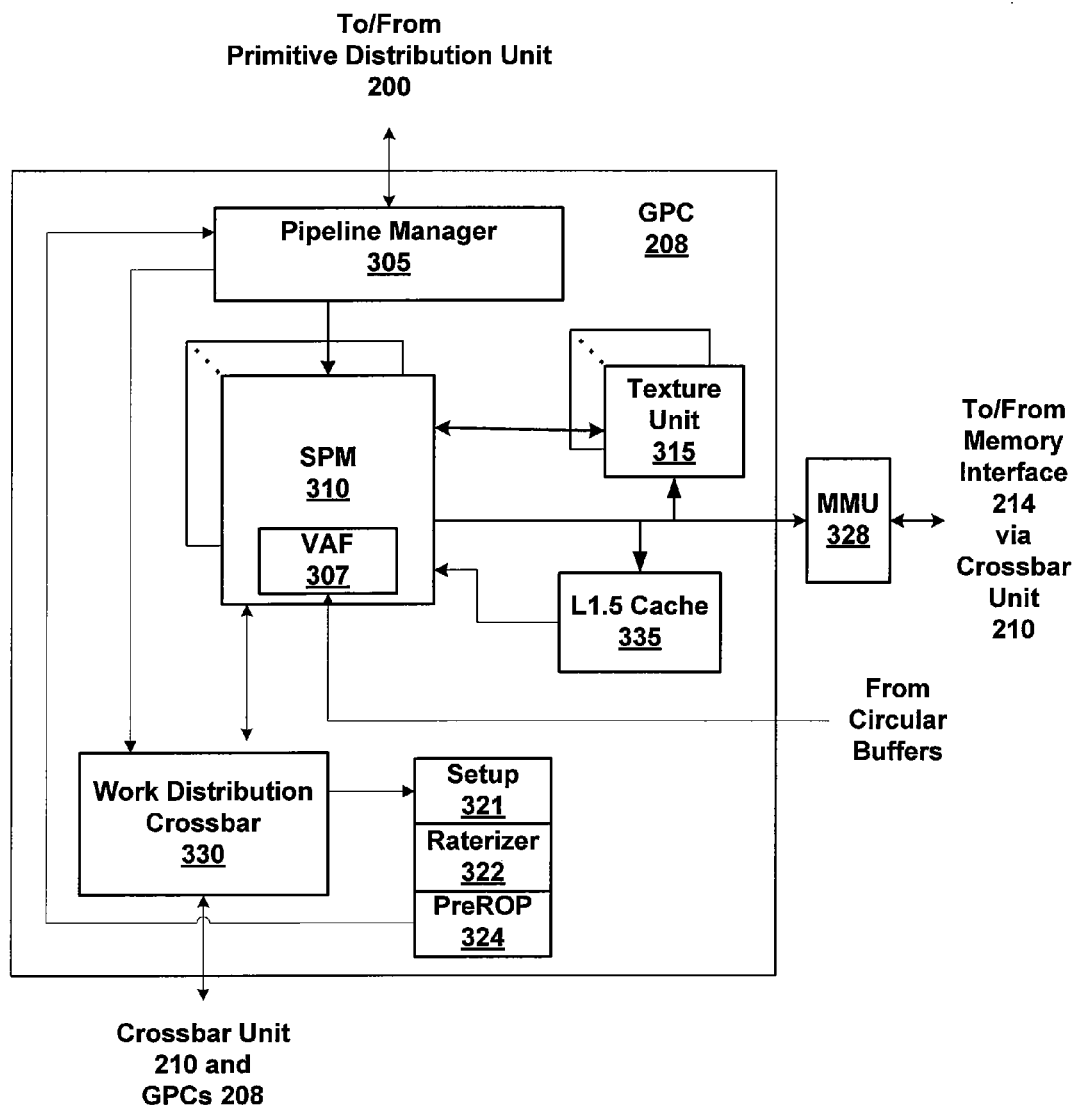
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104.

It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Vertex attribute buffers (VABs) are written by the front end unit 212 or the primitive distribution unit 200. Each SPM 310 includes a VAF (vertex attribute fetch unit) 307 that receives VABs from the primitive distribution unit 200. The VABs may be stored in a circular buffer entry in an L2 cache. The vertices are processed by one or more of hull shaders, domain shaders, vertex shaders, and geometry shaders to produce post-geometry processed vertex attributes that are stored in attribute circular buffer entries in the L2 cache.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether or not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
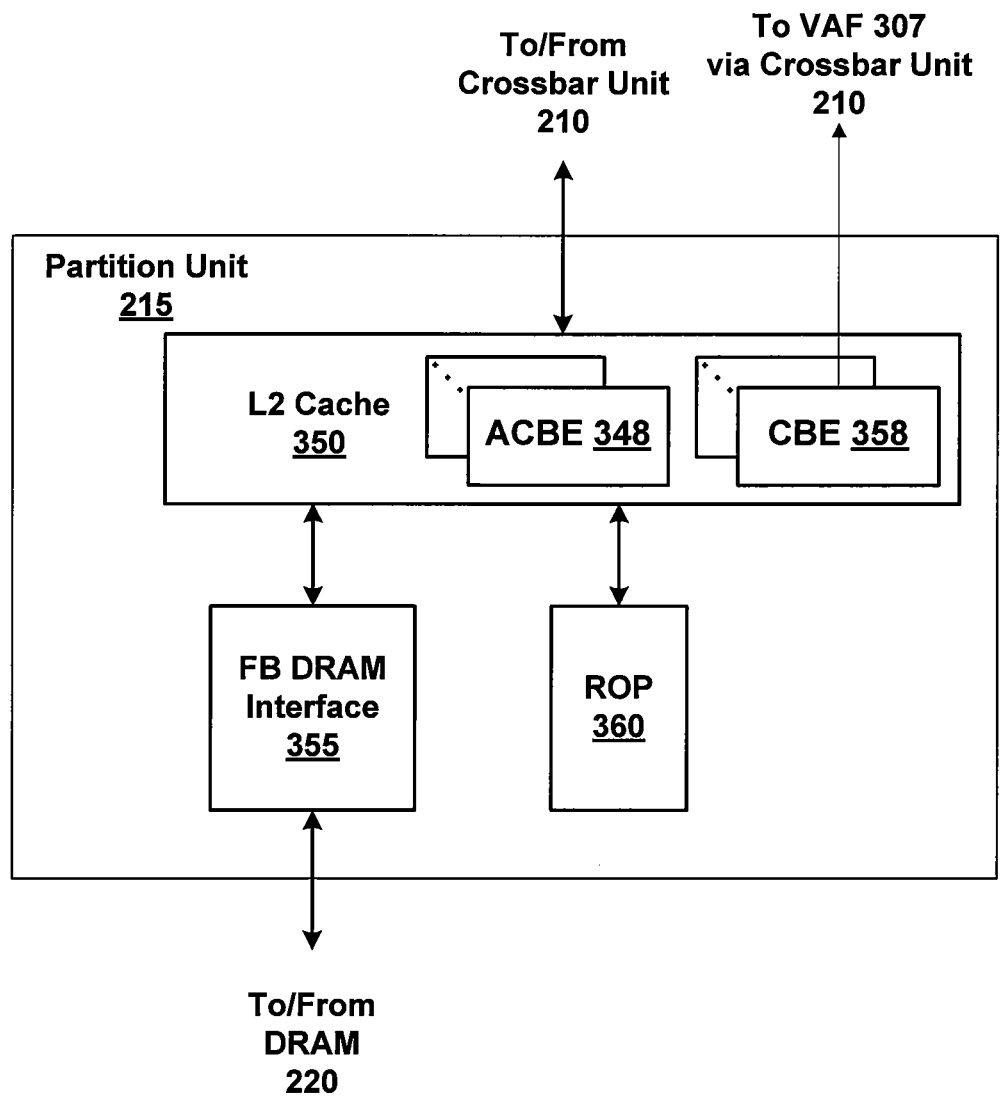
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. In particular, the VABs may be stored in circular buffer entries (CBEs) 358 within the L2 cache 350 that are read by the VAFs 307 through an attribute cache that circumvents the L1 cache 320. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

The L2 cache 350 may store entries of circular buffers such as CBEs 358 that are configured to store VABs, attribute circular buffer entries (ACBE) 348 that are configured to store post-geometry processed primitive attribute data, constants and state information, and the like. A CB manager allocates ACBEs 348 or CBEs 358 to reside in the system shared L2 cache 350, although the L2 cache 350 may flush a CBE 348 or ACBE 348 to backing store if necessary. Normally CBEs 358 and ACBEs 348 are assigned a high stickiness value in the L2 cache 350. More specifically, CBEs 358 and ACBEs 348 are typically marked "evict last," which means a CBE 358 or ACBE 348 will not be evicted from the cache until there is no lower priority data available for eviction. This treatment is useful because the First-In-Random-Out (FIRO) discipline of circular buffer accesses does not work well with the least-recently-used eviction policy used by the L2 cache 350. However, the stickiness value is programmable. In some embodiments, the circular buffers configured to store primitive attribute data may be given a lower, "evict normal" priority, because the primitive attribute reader is able to tolerate more latency compared with processing units reading other data from the L2 cache 350.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CIA" and "thread array" are used synonymously herein.

Figure 3C:
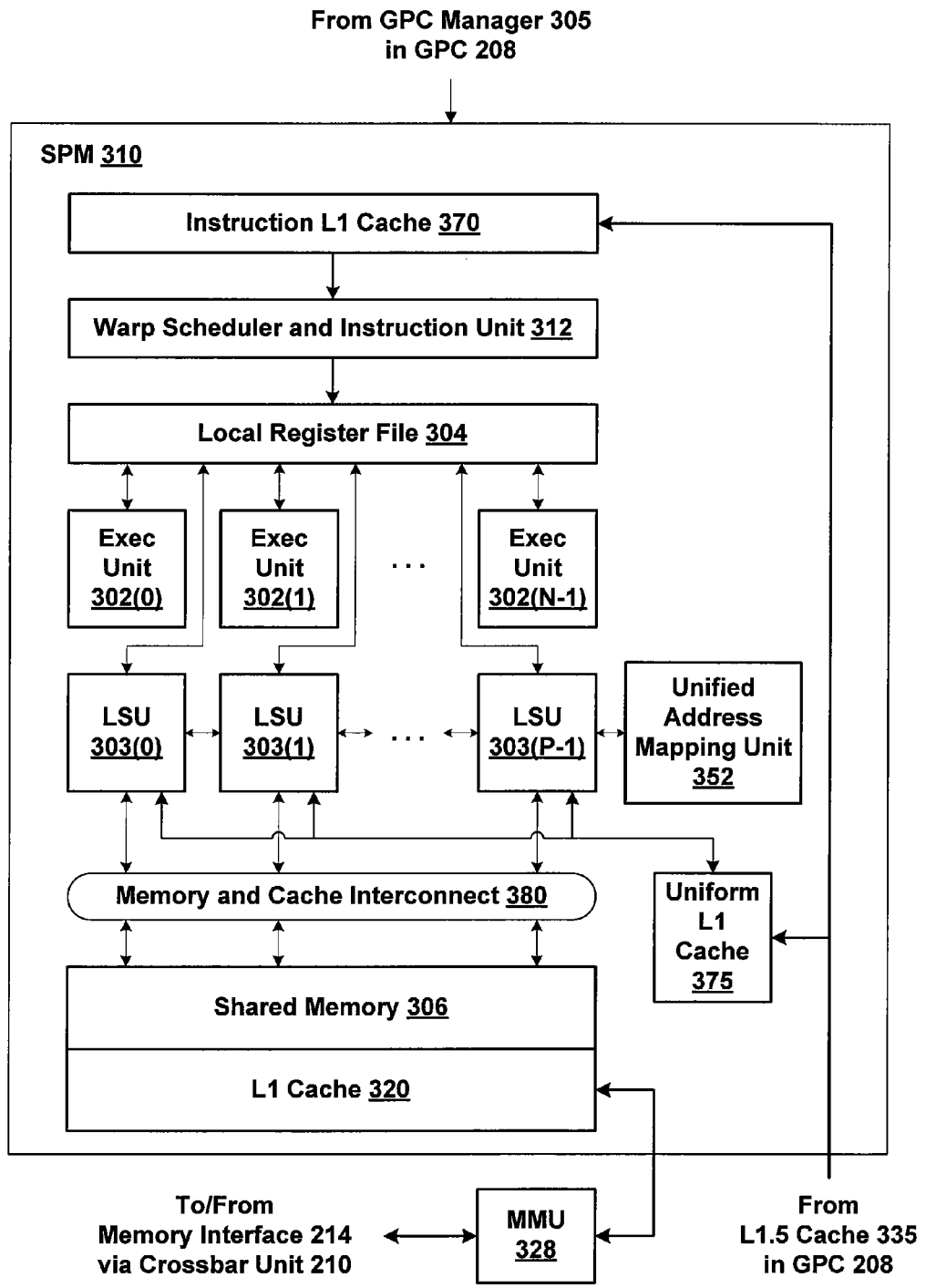
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated.

Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Graphics Pipeline Architecture

Figure 4:
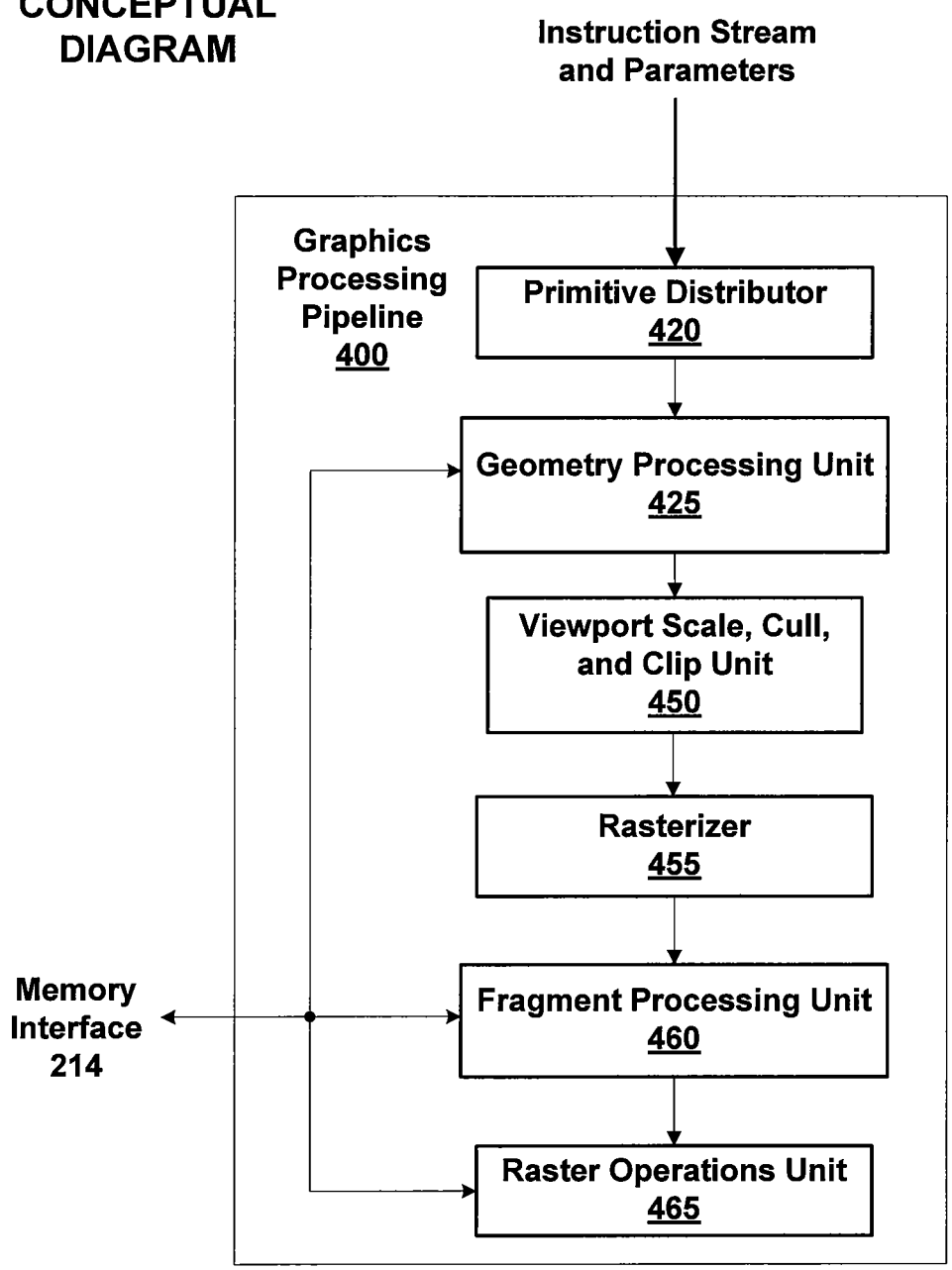
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a geometry processing unit 425, and a fragment processing unit 460. The functions of primitive distributer 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Vertex data for high-order surfaces, primitives, and the like may be stored in the L1 cache 320, L1.5 cache 335, L2 cache 350, parallel processing memory 204, or system memory 104 and accessed as needed to render the primitives. The functions of the primitive distributer 420 may be performed by the primitive distribution unit 200. Primitive distributer 420 receives pointers to primitive index arrays stored in memory. The entries in these index lists point into lists of vertex attributes (vertex attribute buffers), also stored in memory. Because primitives are stored compactly and many primitives can be passed to the primitive distributer 420 in a single draw call, indexed primitive lists and vertex attribute buffers are the most efficient way to convey geometry to the graphics pipeline 400. The front end 212 may be configured to store legacy inline and immediate mode vertices in vertex attribute buffers, so the primitive assembler 420 only has to deal with this one, efficient type of primitive input data, namely primitive index lists. In other embodiments the primitive distributer 420 may receive the vertex data instead of pointers to primitive index lists.

In some embodiments, the GPCs 208 are configured to perform tessellation processing prior to geometry processing. In those embodiments the primitive distributer 420 distributes batches of primitives for tessellation processing to multiple SPMs 310 and streams of tessellated primitive batches are produced. The API primitive ordering may be restored prior to object-space processing of the primitives by either using the same SPMs 310 to perform the object-space processing as was used to perform the tessellation. Alternatively, the primitive batches may be reordered to match the API primitive order after tessellation so that batches of primitives for object-space processing are generated and distributed in API primitive order.

Primitive distributer 420 dices the index list into self-contained batches of indices specifying up to J vertices and K primitives, such that each vertex in a strip, after the first two, specifies a new triangle. In some embodiments, J is 32, K is 30, and batches may occupy from one to eight 32B data packets, depending on the number and type of primitive and contain the following information: indices of vertex attribute buffers and topology information (which vertices in the batch comprise each primitive). Importantly, the primitive distributer 420 works entirely with primitive indices—it does not touch the vertex data itself. The vertex data is later fetched by the SPM 310 assigned for vertex shading.

The bulk of the data transferred (via indices) between geometry processing and rasterization is vertex attributes. The attributes are the parameters calculated for each vertex, such as x, y, z position, texture coordinates, vertex colors, and other shader parameters. Some parameters, such as x,y, z (position) are needed by the rasterizer to determine primitive coverage and depth values. Other attributes are needed, as interpolated values, by the fragment shader. The number and type of attributes depends on the vertex and fragment shaders.

Vertex attributes need to be buffered from the time they are calculated by the SPMs 310 doing object-space processing until they are needed by the primitive setup unit 321 that computes the z attribute plane equations or the fragment processing unit 460 that computes non-z attribute plane equations and shades the primitives using the plane equations. The amount of data that needs to be buffered is highly variable, depending on the number and type of attributes per vertex. The amount of data may be near zero for full-screen primitives and the amount of data may be extremely high in high primitive rate cases. The amount of data may also be highly variable per GPC 208 when a large number of small primitives fall onto a single screen tile.

Because of these potentially large and highly variable buffering requirements, it may be advantageous to store vertex attributes in the L2 cache 350. The L2 cache 350 is a large, pooled resource that is used for many purposes: caching textures, caching rendered pixels, and caching primitive attributes. In high triangle rate cases a greater amount of attribute buffering is needed, so the bulk of the L2 cache 350 may be used to cache (primitive and vertex) attribute data instead of texture data. When requirements for attribute buffering are low, the L2 cache 350 may be used primarily for caching texture data.

Each SPM 310 performing object-space processing is provided with a fixed size linear buffer that is virtually addressed and cacheable. The addresses used to access these linear buffers wrap, so the linear buffers are actually circular FIFO (first-in, first-out) buffers. As SPMs 310 stream vertex attributes into the circular buffers, the SPMs 310 provide indices for entries written to the work distribution crossbar interface 330, which are conveyed to the GPCs 208 performing the screen-space processing. GPCs 208 that need to read attribute circular buffer entries (ACBEs 348) do so at two points: primitive setup and fragment shader interpolation. Entries that are unneeded by a GPC 208 are skipped—not read by the GPC 208, while other entries may be read by multiple GPCs 208.

Because virtual addressing is used for the circular buffers, the full circular buffer may always be allocated, but only cache lines storing valid data need be resident in the L2 cache 350. As previously described, when ACBEs 348 and CBEs 358 are written to the L2 cache 350, the cache line may be marked with "no-evict" status, so the cache line storing attribute data will not be flushed from the L2 cache 350. A CB manager also has the task of freeing ACBEs 348 and CBEs 358 when the GPCs 208 are finished with them. To achieve this, the rasterizers 322 track the ACBEs 348 through the screen-space processing and signal the CB manager when an ACBE 348 may be invalidated.

Geometry processing unit 425 is a programmable execution unit that is configured to execute vertex, hull, domain, and geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling of primitives that lie outsize of the viewport frustum, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Supporting Inline Vertex Attributes

The primitive distribution unit 200 may receive vertex attributes and material properties in two different manners. Inline vertex attributes and material properties are included in the pushbuffer in order to support legacy inline vertex attributes. When the inline vertex attributes are used, an entire set of vertex attributes may be received, even when only one of the vertex attributes has changed. OpenGL supports an immediate mode in which only changed vertex attributes are received and the vertex attributes are considered to be "sticky" or "constant." The primitive distribution unit 200 tracks the different types of vertex attributes and generates a VAB index whenever a new VAB is generated. A new VAB may be generated when a new vertex is launched that has one or more vertex attributes that are different than an existing VAB.

The primitive distribution unit 200 writes a set of vertex attributes for a vertex into a vertex attribute buffer (VAB) that is stored in memory. In one embodiment, the VAB is stored in an entry of a circular buffer in the L2 cache 350. The size of the VAB is configurable. Inline vertex attributes stored in a VAB appear to units that read the VAB, to be immediate (indexed) attributes that are fetched from memory. The advantage of storing the vertex attributes in a VAB and reading the vertex attributes from the VAB is that dedicated wiring from the primitive distribution unit 200 to the distributed units (the geometry processing units 425 within the GPCs 208) that process the vertex attributes is not needed. Instead, existing data distribution mechanisms, e.g., the crossbar unit 210 and L2 cache 350, are used to distribute and store the vertex attributes. The crossbar unit 210 and L2 cache 350 are also used to by the GPCs 208 to read the vertex attributes for processing.

Figure 5A:
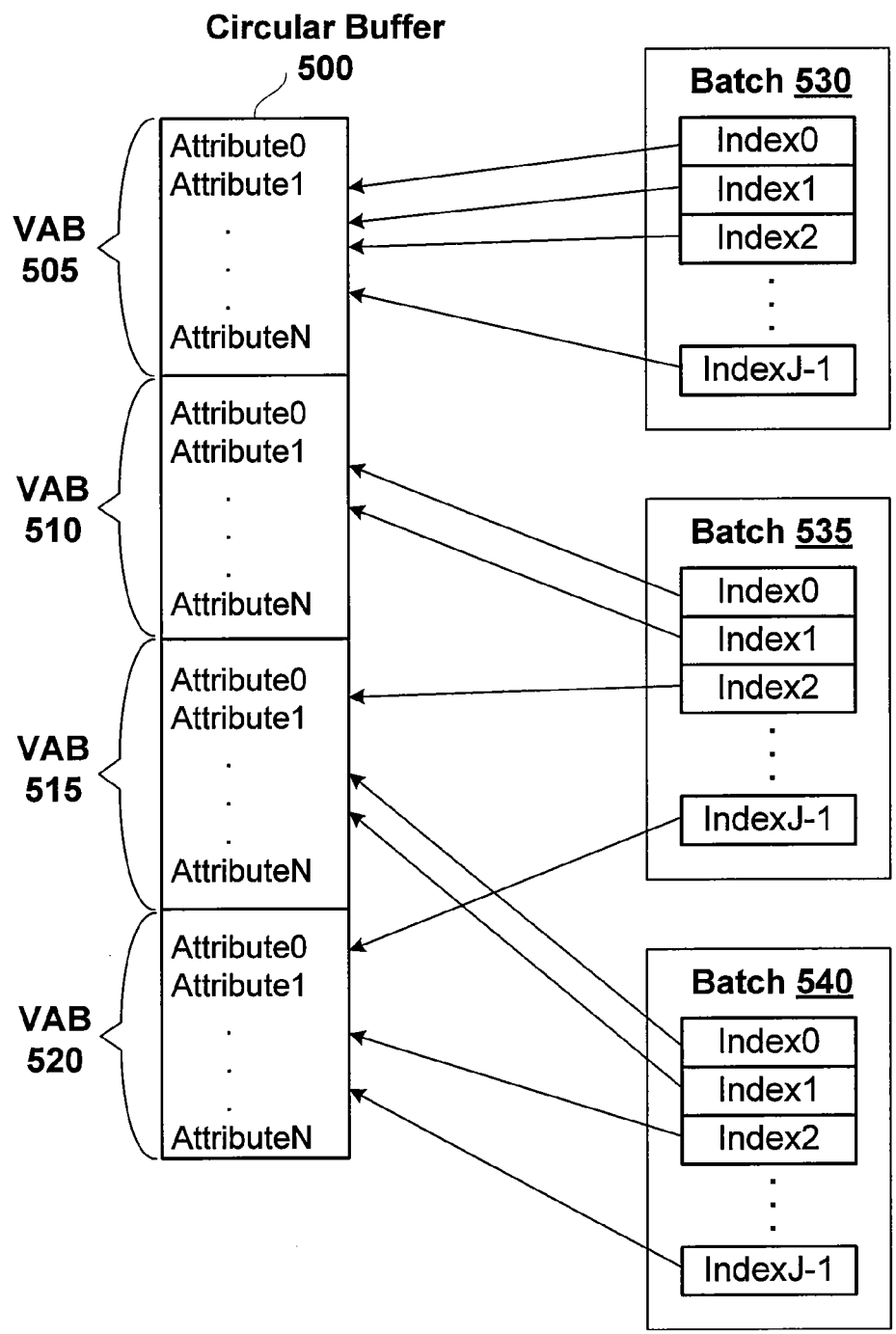
FIG. 5A is a conceptual diagram of the vertex attribute buffers and primitive batches, according to one embodiment of the present invention.

FIG. 5A is a conceptual diagram of VABs 505, 510, 515, and 520 that are stored in CBEs of circular buffer 500 and primitive batches 530, 535, and 540, according to one embodiment of the present invention. The batches 530, 535, and 540 are constructed by the primitive distribution unit 200 and include one or more indices that each reference a set of N vertex attributes. In one embodiment N is 128 vertex attributes. Each index in a batch may specify the same VAB, as shown by indices 0 through J−1 in the batch 530 that each specify VAB 505. Two or more indices in a batch may specify different VABs, as shown by the indices in batch 535 where index0 and index1 specify VAB 510, index2 specifies VAB 515, and indexN specifies VAB 520. Indices in different batches may also specify the same VAB, as shown by index2 of batch 535 and index0 and index1 of batch 540 that both specify VAB 515.

Allowing multiple batches to specify the same VAB enables the primitive distribution unit 200 to write the set of attributes for a vertex to a single VAB stored in a CBE 358 in the L2 cache 350 that is later read by multiple consumers of the VAB via the VAF 307. Importantly, each consumer may read the VAB when that consumer is ready to process the vertex attributes. In contrast, when the vertex attributes are output directly from the primitive distribution unit 200 over a dedicated interface the vertex attributes are broadcast and locally stored by each one of the consumers. Alternatively, the vertex attributes are output to or read by all of the consumers through dedicated interfaces between each one of the consumers and the point of batch generation. In either case, the vertex attributes are either redundantly stored or distributed through dedicated interfaces. Storing VABs in CBEs 358 advantageously does not require dedicated interfaces between the point of batch generation and points of vertex attribute consumption or redundant storage of the vertex attributes.

Conventional OpenGL workstation applications change material parameter state by updating a material property often, e.g. every few primitives. Each change in material parameter state corresponds to a different VAB since material properties are treated as vertex attributes and are stored in VABs. Conventional graphics processing architectures do not allow state changes within a batch of primitives (where a batch consists of 32 vertices and associated primitives). Consequently, changing material properties when using a conventional graphics processing architecture often results in very small batches and performance may be reduced since each batch incurs some processing overhead.

Each vertex in a batch generated by the primitive distribution unit 200 is associated with a VAB index for material parameters as well as a regular index that may be used to fetch regular indexed vertex attributes that change from one vertex to the next. A change in the material parameters produces a new VAB that may be specified by one or more vertices in the same batch or in different batches. Consequently, batches no longer need to be broken into smaller batches in response to OpenGL changing the material parameters since vertices in the same batch can be associated with different material parameters. Put another way, the batches constructed are much more likely to be full since different groups of vertices in the same batch can specify different VABs. This leads to much better performance on workstation applications.

Figure 5B:
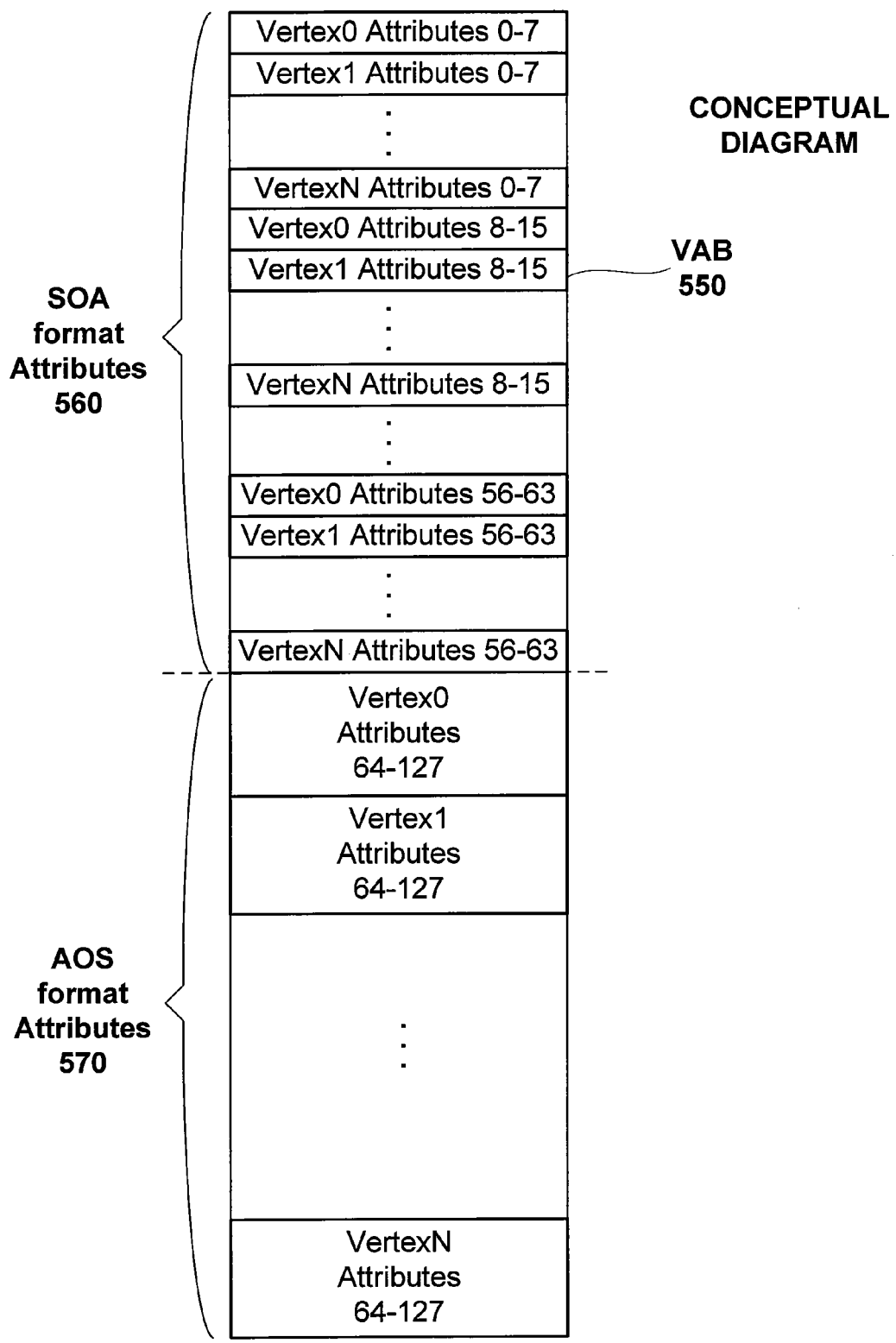
FIG. 5B is a conceptual diagram of the formats of a vertex attribute buffer in memory, according to one embodiment of the present invention.

FIG. 5B is a conceptual diagram of the structure of array (SOA) and array of structure (AOS) formats of a VAB 550 in memory, according to one embodiment of the present invention. A VAB has two different formats in memory as a function of vertex attribute number. In one embodiment each vertex can have a maximum of 128 scalar attributes. For the first 64 scalar attributes of a vertex, the VAB 550 uses a pseudo-SOA format that is optimized for inline immediate attributes that typically change every vertex, shown as SOA format attributes 560. For the second 64 scalar attributes of a vertex, the VAB 550 uses an AOS format that is optimized for attributes that change less frequently, such as material constants. An optimized format means the format in memory is friendly to the memory system and leads to efficient transfers from the L2 cache 350 and the SPM 310. An application program can control the format for a particular attribute by simply assigning the attribute to a location in the first 64 entries of the scalar attributes or to a location in the second 64 entries of the scalar attributes in a vertex's VAB.

Figure 6:
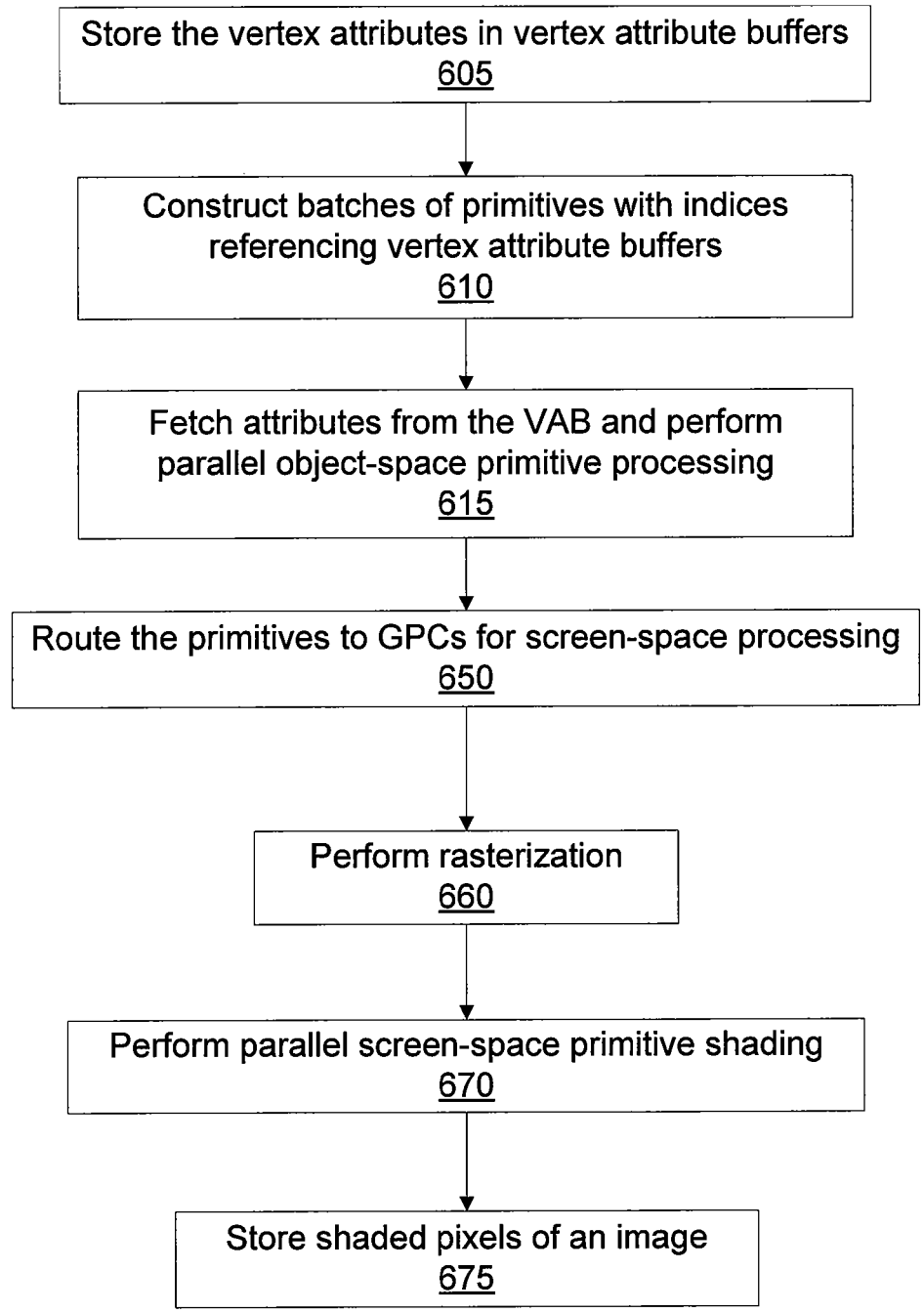
FIG. 6 is a flow diagram of method steps for generating and using the vertex attribute buffers, according to one embodiment of the present invention.

FIG. 6 is a flow diagram of method steps for generating and using the vertex attribute buffers, according to one embodiment of the present invention. At step 605 the front end unit 212 or the primitive distribution unit 200 writes the vertex attributes into a VAB that is stored in a circular buffer of the L2 cache 350. At step 610 the primitive distribution unit 200 generates batches of vertices that specify VABs. Each time a state change occurs a new VAB is referenced. At step 615 the VAFs 307 fetch the vertex attributes from a CBE 358 in the L2 cache 350 and the SPMs 310 perform object-space processing on the primitives to produce streams of object-space processed primitives. The time to process one vertex is independent of how large the primitive appears on the screen. By distributing geometry processing in batches, the processing load is distributed across the GPCs 208.

At step 650 each primitive is routed by the work distribution crossbar interface 330 through the work distribution crossbar fabric 334 to the GPC(s) for screen-space processing. Setup 321 also computes the primitive bounding box and initialization parameters for the rasterizer 322, and performs various culling operations such as back-face and zero-area culling. Setup 321 receives primitive descriptors from the work distribution crossbar interface 330. Each primitive descriptor is associated with ACBE 348 address, i.e., a pointer to the processed vertex attribute data stored in an attribute circular buffer (ACBE 348) in the L2 cache 350.

At step 660 the rasterizer 322 iterates within the primitive bounding box, guided by the edge equations, to identify screen tiles with sample coverage. Rasterizer 322 performs coarse rasterization of the primitive pixels that lie within the screen-space tile(s) for which the GPC 208 is responsible. The rasterizer 322 advantageously skips over screen tiles that are assigned to other rasterizers 322. In some embodiments the rasterizer 322 is configured to skip over screen tiles in zero time. At step 660 the rasterizer 322 also performs fine rasterization to determine the sample coverage for the primitive pixels that lie within the screen-space tile(s) for which the GPC 208 is responsible. When no samples within a screen tile are covered, the primitive may be culled for the screen-space tile.

At step 670 the primitive processing engines receive the primitives that have survived the culling operations and perform parallel screen-space primitive shading using the non-z attributes. Multiple primitive processing engines may read vertex attributes stored in ACBEs 348 in order to shade the vertex attributes. Each primitive processing engine sends color (and optionally z) outputs to ROPs 360 associated with the frame-buffer partitions over the crossbar unit 210. At step 675 the shaded pixels of an image are output and stored.

In summary, the advantage of storing the vertex attributes in a VAB and reading the vertex attributes from the VAB is that dedicated wiring from the primitive distribution unit 200 to the distributed units that process the vertex attributes is not needed. Instead, existing data distribution mechanisms, e.g., the crossbar unit 210 and L2 cache 350, are used to distribute and store the vertex attributes. The crossbar unit 210 and L2 cache 350 are also used to by the GPCs 208 to read the vertex attributes for processing. Additionally, since each batch generated by the primitive distribution unit 200 may include indices that specify more than one VAB, changing the material properties or other vertex attributes produces a new VAB that may be specified by one or more vertices in the same batch or in different batches. Consequently, the batches that are constructed are much more likely to be full since different groups of vertices in the same batch can specify different VABs. This leads to much better performance on workstation applications.

Although the method steps are described in conjunction with the systems of FIGS. 1, 2, 3A, 3B, and 3C, persons skilled in the art will understand that any system configured to perform the method steps, in any order, is within the scope of the inventions.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A system for storing and distributing vertex attributes, the system comprising:
    a primitive distribution unit configured to:
    construct a first primitive batch that includes a first plurality of primitives and a first plurality of vertexes, wherein each vertex in the first plurality of vertexes is associated with a primitive in the first plurality of primitives,
    store vertex attributes of a first vertex included in the first primitive batch into a first vertex attribute buffer that is specified by a first vertex attribute buffer index that is also included in the first primitive batch and that is associated with the first vertex, wherein the vertex attributes include a first vertex attribute that is based on an inline vertex attribute that is identical to a vertex attribute already received by the primitive distribution unit, wherein the inline vertex attribute includes a vertex parameter included in a pushbuffer, and
    distribute the first vertex attribute buffer index to multiple parallel processing engines; and
    at least two multiple parallel processing engines, wherein each parallel processing engine is configured to:
    read one or more of the vertex attributes from the first vertex attribute buffer, and
    process the one or more vertex attributes to produce shaded pixels of an image,
    wherein at least one of the parallel processing units is configured to read the first vertex attribute from the first vertex attribute buffer and process the first vertex attribute as an indexed vertex attribute.

2. The system of claim 1, wherein the primitive distribution unit is further configured to store vertex attributes of a second vertex in a second vertex attribute buffer that is specified by a second vertex attribute buffer index.

3. The system of claim 2, wherein a vertex attribute in the second vertex attribute buffer differs for a corresponding vertex attribute in the first vertex attribute buffer.

4. The system of claim 3, wherein the vertex attribute is a material property.

5. The system of claim 4, wherein additional vertex attributes that change from the first vertex to a next vertex are stored in a location in memory that is specified by a regular index.

6. The system of claim 2, wherein the first vertex attribute buffer is stored in a first entry of a circular buffer and the second vertex attribute buffer is stored in a second entry of the circular buffer, and the circular buffer is writable only by the primitive distribution unit and readable only by the multiple parallel processing engines.

7. The system of claim 1, wherein a first portion of the vertex attributes in the first vertex attribute buffer are stored as an array of structures and a second portion of the vertex attributes in the first vertex attribute buffer are stored as a structure of arrays.

8. A method for storing and distributing vertex attributes, comprising:
    constructing a first primitive batch that includes a first plurality of primitives and a first plurality of vertexes, wherein each vertex in the first plurality of vertexes is associated with a primitive in the first plurality of primitives;
    storing vertex attributes of a first vertex included in the first primitive batch into a first vertex attribute buffer that is specified by a first vertex attribute buffer index that is also included in the first primitive batch and that is associated with the first vertex, wherein the vertex attributes include a first vertex attribute that is based on an inline vertex attribute, wherein the inline vertex attribute includes a vertex parameter included in a pushbuffer;
    distributing the first vertex attribute buffer index to multiple parallel processing engines;
    reading one or more of the vertex attributes from the first vertex attribute buffer; and
    processing the one or more vertex attributes to produce shaded pixels of an image, wherein the first vertex attribute is processed as an indexed vertex attribute.

9. The system of claim 1, wherein the first primitive batch further includes a first plurality of vertex attribute buffer indexes, and wherein each vertex in the first plurality of vertexes is associated with a different vertex attribute buffer index in the first plurality of vertex attribute buffer indexes.

10. The system of claim 9, wherein the first vertex attribute buffer index specifies first vertex attribute buffer, and a second vertex attribute buffer index that is included in the first primitive batch and that is associated with a second vertex included in the first primitive batch specifies a second vertex attribute buffer.

11. The system of claim 9, wherein:
    the primitive distribution unit is further configured to:
        construct a second primitive batch that includes a second plurality of primitives and a second plurality of vertexes, wherein each vertex in the second plurality of vertexes is associated with a primitive in the second plurality of primitives, and
        distribute the second vertex attribute buffer index to the at least two multiple parallel processing engines,
        wherein both the first vertex attribute buffer index and the second vertex attribute buffer index specify the first vertex attribute buffer.

12. The method of claim 8, wherein the first primitive batch further includes a first plurality of vertex attribute buffer indexes, and wherein each vertex in the first plurality of vertexes is associated with a different vertex attribute buffer index in the first plurality of vertex attribute buffer indexes.

13. The method of claim 12, wherein the first vertex attribute buffer index specifies first vertex attribute buffer, and a second vertex attribute buffer index that is included in the first primitive batch and that is associated with a second vertex included in the first primitive batch specifies a second vertex attribute buffer.

14. The method of claim 12, further comprising:
constructing a second primitive batch that includes a second plurality of primitives and a second plurality of vertexes, wherein each vertex in the second plurality of vertexes is associated with a primitive in the second plurality of primitives; and
distributing the second vertex attribute buffer index to the multiple parallel processing engines,
wherein both the first vertex attribute buffer index and the second vertex attribute buffer index specify the first vertex attribute buffer.

15. The system of claim 13, wherein the primitive distribution unit is further configured to:
determine that a new vertex is launched that has one or more vertex attributes that are different than a vertex associated with existing vertex attribute buffers, and
generate a new vertex attribute buffer index in response to determining that the new vertex is launched.

16. The system of claim 1, further comprising:
a front end unit configured to:
receive a pushbuffer that includes the vertex attributes from a host interface, and
transmit primitive indices that identify the vertex attributes to the primitive distribution unit,
wherein the first plurality of primitives are specified by the primitive indices.

17. The system of claim 1, wherein the inline vertex attribute is included in a pushbuffer that is transmitted by a central processing unit to a parallel processing unit that includes the primitive distribution unit.

* * * * *

UNITED STATES PATENT AND TRADEMARK OFFICE
CERTIFICATE OF CORRECTION

| | | |
|---|---|---|
| PATENT NO. | : 8,810,592 B2 | Page 1 of 1 |
| APPLICATION NO. | : 12/895546 | |
| DATED | : August 19, 2014 | |
| INVENTOR(S) | : Hakura et al. | |

It is certified that error appears in the above-identified patent and that said Letters Patent is hereby corrected as shown below:

In the Claims

Column 19, Claim 15, Line 12, please delete "13" and insert --1-- therefor.

Signed and Sealed this
Second Day of December, 2014

Michelle K. Lee
*Deputy Director of the United States Patent and Trademark Office*